United States Patent Office.

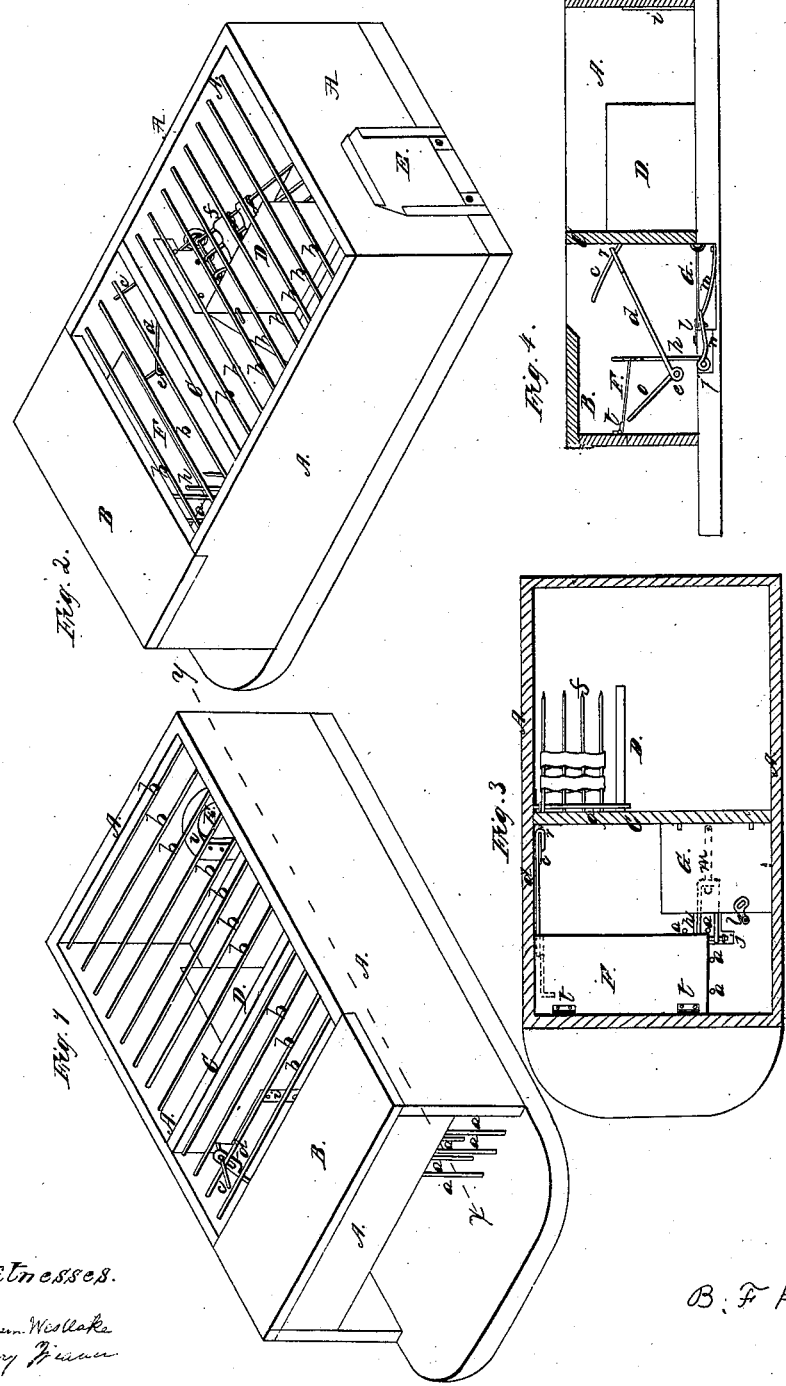

BENJAMIN F. HANCOCK, OF MONROE, WISCONSIN.

Letters Patent No. 77,372, dated April 28, 1868.

---

IMPROVED ANIMAL-TRAP.

---

*The Schedule referred to in these Letters Patent and making part of the same.*

---

TO ALL WHOM IT MAY CONCERN:

Be it known that I, BENJAMIN F. HANCOCK, of Monroe, Green county, Wisconsin, have invented certain new and useful Improvements in Animal-Traps; and I do hereby declare that the following is a full, clear, and exact description of the construction and operation of the same, reference being had to the annexed drawings, making a part of this specification, in which—

Figure 1 is a perspective view in which the front is shown.

Figure 2, a perspective view in which the rear is shown.

Figure 3, a horizontal section on red line $x\,y$.

Figure 4 is a side view with the side removed, showing the interior.

Like letters refer to like parts in all the figures.

My invention relates to that class of traps having two apartments or more, so constructed that the animal having been caught in one, in passing into another, resets the trap.

Letter A indicates the sides of the trap, which may be made of wood, either square or oblong in form, and in size adapted to the animal to be caught.

The top of the trap is secured by the wood covering B and the metallic rods $b$. C is a partition, having an opening in it, dividing the trap into two compartments.

The lower part of the front end of the trap is made open to admit the entrance of the animal. A door, F, of sufficient length, and of such width that when down it will stand at an angle of about forty-five degrees with the bottom of the trap, is hinged, at $t\,t$, to the front of the trap. This door opens upwards and inwards. The remainder of the open space in the front of the trap, and also the open space at the end of the door, are secured by the upright rods $a$. Through these rods the animal can readily see the bait.

The construction of the door F is such that if by mistake the trap should not be set, the animal, seeing the bait, can easily enter the trap by gently pressing against and raising the door F. In this respect this trap is believed to have an advantage over all others. This door is held open by means of a rod or wire, so bent that it has two arms—one, $h$, perpendicular, the other, $n$, horizontal, and pivoted at $j$. The upper end of $h$ has notches to receive the edge of the door, and the arm $n$ extends under the platform G, and is bent or bowed so that it rests upon a spring, $m$, which presses the arm $h$ against the edge of the door. The platform G is hinged to the partition C, and may be secured, so that it cannot be raised, by means of the catch $l$. Over the platform is the bait-hook. The animal passing to the bait must step upon the platform G, which, near the front, rests upon the arm $n$, and this arm $n$ being pressed down by the weight of the animal, removes the arm $h$ from the edge of the door, and the door falls. A portion of the bottom of the trap may be cut away to permit the free operation of the platform and spring.

In many traps, the spring used is so located within the trap, that it becomes wet, and is soon spoiled by rust. The location of the spring in this trap will obviate this difficulty. The door F may be made whole, as shown, or it may be made in part of bars like the inner door or gate $f$.

A wire having two arms, $d$ and $o$, as shown, is pivoted, at $e$, to the inside of the trap on the side opposite the platform. The arm $o$ is again bent, as shown at $s$, and extends outside of the door F; and this door, when down, is against the bent portion of the arm $o$, marked $s$. The other end of this wire is provided with a hook, as shown at $r$. $f$ is a gate, made of wire, properly secured. This gate is pivoted by the rod $g$, or otherwise, near the top of the opening between the two compartments, while the points of the wires rest on the bottom of the trap at some distance from the said opening, and in the further compartment. D is a partial partition to prevent the passage of the animal back into the first apartment. $c$ is one of the wires of the gate $f$, extended, and passes through the hook $r$. The animal passing from the first into the second apartment, raises the gate $f$. The lever $c$, acting upon the lever $d\,o$, raises the door F, and resets the trap. The animal can be removed from the trap through the slide-door E. At the openings, a metallic protector, $i$, may be used.

Having thus fully described my invention, what I desire to secure by Letters Patent, and claim as new, is—

The door F, rod or trigger $h$, spring $m$, platform G, and rods $d$ and $c$, all constructed, arranged, and operated, substantially as and for the purpose described.

BENJAMIN F. HANCOCK.

Witnesses:
SPENCER H. SMITH,
CHAS. A. LYTLE.